(12) United States Patent
Tang et al.

(10) Patent No.: US 11,613,822 B1
(45) Date of Patent: Mar. 28, 2023

(54) RESIN CARBON ANODE GREEN BODY AND PREPARATION METHOD THEREOF, GREEN BODY INTERMEDIATE AND PREPARATION METHOD THEREOF, AND CARBON ANODE AND PREPARATION METHOD THEREOF

(71) Applicant: Shandong Shengquan New Materials Co., Ltd., Shandong (CN)

(72) Inventors: Diyuan Tang, Shandong (CN); Weixin Liu, Shandong (CN); Qing Ma, Shandong (CN); Guobao Peng, Shandong (CN)

(73) Assignee: SHANDONG SHENGQUAN NEW MATERIALS CO., LTD., Shandong (CN)

( * ) Notice: Subject to any disclaimer, the term of this patent is extended or adjusted under 35 U.S.C. 154(b) by 0 days.

(21) Appl. No.: 17/696,085

(22) Filed: Mar. 16, 2022

(30) Foreign Application Priority Data

Jan. 10, 2022 (CN) .......................... 202210022319.9

(51) Int. Cl.
 *C25B 11/00* (2021.01)
 *C25C 3/12* (2006.01)
(52) U.S. Cl.
 CPC .................................. *C25C 3/125* (2013.01)
(58) Field of Classification Search
 CPC ....... Y02E 60/50; C25B 11/00; C25B 11/043; C25B 11/051; C25D 17/10; C25D 7/0642;

(Continued)

(56) References Cited

U.S. PATENT DOCUMENTS 3,856,574 A * 12/1974 Amagi ..................... H01M 4/96
 264/105
4,188,279 A * 2/1980 Yan .......................... C25C 3/125
 252/502

(Continued)

FOREIGN PATENT DOCUMENTS

| CN | 109400163 | 2/2020 |
| CN | 112442155 | 3/2021 |

(Continued)

OTHER PUBLICATIONS

Extended European Search Report dated Nov. 29, 2022 in European Patent Application No. 22173889.1.

*Primary Examiner* — Zulmariam Mendez
(74) *Attorney, Agent, or Firm* — Wenderoth, Lind & Ponack, L.L.P.

(57) ABSTRACT

The present application provides a resin carbon anode green body, and a resin carbon anode green body intermediate is obtained by hardening treatment of the resin carbon anode green body, and the resin carbon anode green body intermediate has the following spectral characteristics when tested by gas chromatography-mass spectrometry: there are characteristic peaks at the retention times of $4.95 \pm 0.3$ min, $5.32 \pm 0.3$ min, $5.47 \pm 0.3$ min and $5.92 \pm 0.3$ min. The present application also provides a method for preparing the resin carbon anode green body. In addition, the present application also provides a resin carbon anode green body intermediate, a resin carbon anode and the corresponding preparation methods and uses.

30 Claims, 2 Drawing Sheets

(58) Field of Classification Search
CPC ........... C25C 3/125; C25C 7/00; C25C 7/025; C25C 3/08; C25C 3/12
See application file for complete search history.

(56) References Cited

U.S. PATENT DOCUMENTS

| | | | | |
|---|---|---|---|---|
| 4,431,503 A | * | 2/1984 | Withers | ................. C25C 3/125 264/109 |
| 2007/0246352 A1 | * | 10/2007 | Keister | ................. C25B 11/043 204/290.01 |

FOREIGN PATENT DOCUMENTS

| | | |
|---|---|---|
| CN | 113336552 | 9/2021 |
| CN | 113603488 | 11/2021 |

* cited by examiner

RESIN CARBON ANODE GREEN BODY AND PREPARATION METHOD THEREOF, GREEN BODY INTERMEDIATE AND PREPARATION METHOD THEREOF, AND CARBON ANODE AND PREPARATION METHOD THEREOF

FIELD OF THE INVENTION

The present application relates to the technical field of the carbon materials, in particular to a resin carbon anode green body and a preparation method thereof, a green body intermediate and a preparation method thereof, and a carbon anode and a preparation method thereof.

BACKGROUND OF THE INVENTION

Pre-roasted anode is an anode material used in the electrolytic aluminum industry for electrolysis of alumina to produce metal aluminum, and it is an important raw material in the industry of electrolysis of alumina. At present, the anode is prepared by using petroleum coke as a main raw material, combining the petroleum coke with coal tar pitch, and then going through processes such as forming, roasting, etc. However, using coal tar pitch as a binding agent will release harmful substances such as sulfur dioxide at high temperature, pollute the environment, and reduce the product yield. In addition, in the preparation of anode using coal tar pitch, the temperature during forming is about 145° C. After forming, it needs to be put into water for water cooling to improve the strength, and then roasted for 20-30d to obtain the finished anode product. The process is complicated, the pass rate is low, and the pollution is serious.

Phenolic resin is a high molecular polymer synthesized from phenol and formaldehyde as raw materials under alkali or acid conditions. It has the characteristics of good wettability with carbon materials and high carbon residue at high temperature. At present, phenolic resin has been widely used in refractory materials and high temperature resistant materials as a wetting agent for graphite. In the prior art, although the phenolic resin has a relatively high carbon residue, and is excellent in wetting and bonding of carbon materials, the carbonized phenolic resin contains a large amount of hard carbon, which is difficult to graphitize, resulting in a high resistivity.

After the phenolic resin is modified, the resistivity of the resin after carbonization is effectively reduced. However, the current modified phenolic resin contains a large amount of sulfur or metal ions, which will cause secondary pollution to the anode when applied to anodes for electrolytic production of aluminum. Therefore, there is an urgent need to provide a phenolic resin with low sulfur content, few metal components, and good low-temperature carbonization performance.

SUMMARY OF THE INVENTION

In order to solve the above-mentioned problems, the purpose of the present application is to provide a resin carbon anode green body and a preparation method thereof, the resin carbon anode green body comprises a modified phenolic resin with low sulfur content, few metal components, and good low-temperature carbonization performance, and after being treatment with appropriate conditions, the spectral characteristics of phenolic resin can be detected when tested by gas chromatography-mass spectrometry.

1. A resin carbon anode green body, wherein, a resin carbon anode green body intermediate is obtained by hardening treatment of the resin carbon anode green body, and the resin carbon anode green body intermediate has the following spectral characteristics when tested by gas chromatography-mass spectrometry: there are characteristic peaks at retention times of 4.95±0.3 min, 5.32±0.3 min, 5.47±0.3 min and 5.92±0.3 min.

2. The resin carbon anode green body according to item 1, wherein, the resin carbon anode green body intermediate has the following spectral characteristics when tested by gas chromatography-mass spectrometry: there are characteristic peaks at retention times of 4.95±0.3 min, 5.32±0.3 min, 5.47±0.3 min, 5.92±0.3 min, 6.10±0.3 min, 6.40±0.3 min and 6.50±0.3 min. 3. The resin carbon anode green body according to item 1, wherein, the resin carbon anode green body intermediate has a graph of gas chromatography-mass spectrometry as shown in FIG. 1.

4. The resin carbon anode green body according to any one of item 1-3, wherein, a gas chromatography-mass spectrometer used in a test of the gas chromatography-mass spectrometry is a 7890B/5977B GC/MSD, and a chromatographic column is a VF-1701MS capillary column.

5. The resin carbon anode green body according to any one of items 1-4, wherein, the resin carbon anode green body is obtained by kneading and forming treatment of a mixed material comprising modified phenolic resin and aggregate;

preferably, before the kneading treatment, a temperature of the modified phenolic resin is raised to 30-50° C.

6. The resin carbon anode green body according to item 5, wherein, the modified phenolic resin comprises lignin-modified phenolic resin, a polyphenolic compound-modified phenolic resin, a polyhydroxy compound-modified phenolic resin-modified phenolic resin, or a mixture thereof;

preferably, the lignin is acidic lignin, the polyphenolic compound is one or two or more selected from the group consisting of pyrogallol, tea polyphenols, tannic acid and tannin extract, and the polyhydroxy compound is one or two or more selected from the group consisting of maltose, sucrose, glucose, fructose, oxidized starch, sorbitol, and dextrin.

7. The resin carbon anode green body according to item 5, wherein, the aggregate comprises one or more of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm;

preferably, in terms of a mass percentage of a total weight of the aggregate, the calcined coke with the particle size of 8-5 mm is 5-20 wt %, the calcined coke with the particle size of 5-3 mm is 10-25 wt %, the calcined coke with the particle size of 3-1 mm is 15-30 wt %, the calcined coke with the particle size of 1-0 mm is 10-20 wt %, and the calcined coke fine powder with the particle size of less than 0.075 mm is 25-45 wt %.

8. The resin carbon anode green body according to item 5, wherein, during the kneading treatment, a kneading time is 10-100 min, a kneading temperature is 40-60° C., and the kneading time is preferably 20-60 min;

preferably, during the kneading treatment, the modified phenolic resin is continuously added within 10-30 min until the addition is completed;

more preferably, a flow rate of the modified phenolic resin during continuous addition is 1-3 kg/s.

9. The resin carbon anode green body according to any one of items 5-8, wherein, in a raw material of the resin carbon anode green body, in parts by weight, the modified phenolic resin is 5-15 parts, and the aggregate is 85-95 parts.

10. The resin carbon anode green body according to item 5, wherein, the forming treatment is carried out using an electric screw press or a vibration press.

11. The resin carbon anode green body according to any one of items 1-10, wherein, the resin carbon anode green body is obtained by the kneading and forming treatment of the mixed material comprising modified phenolic resin and aggregate, and then subjected to a test of the gas chromatography-mass spectrometry after hardening treatment; wherein a hardening temperature is 120-270° C., and a pyrolysis temperature selected for the test is 600° C.

12. A method for preparing the resin carbon anode green body according to any one of items 1-11, wherein, mixing materials: a mixed material comprises modified phenolic resin and aggregate;

kneading treatment: a kneading time is 10-100 min;

forming treatment: being carried out using an electric screw press or a vibration press;

preferably, before the kneading treatment, a temperature of the modified phenolic resin is raised to 30-50° C.;

more preferably, during the kneading treatment, the modified phenolic resin is continuously added within 10-30 min until the addition is completed, and a kneading temperature is 40-60° C.;

more preferably, a flow rate of the modified phenolic resin during continuous addition is 1-3 kg/s.

13. A resin carbon anode green body intermediate, the green body intermediate is obtained by hardening treatment of the green body of any one of items 1-10, wherein a content of a volatile component of the green body intermediate is 0.4-2%;

preferably, a volume density of the green body intermediate is 1.6-1.8 g/m$^3$;

more preferably, a hardening temperature is 120-270° C., and a hardening time is 1-10 h.

14. A method for preparing the resin carbon anode green body intermediate of item 13, wherein, the method comprising:

mixing materials: a mixed material comprises modified phenolic resin and aggregate;

kneading treatment: a kneading time is 10-100 min;

forming treatment: being carried out using an electric screw press or a vibration press;

hardening treatment: a hardening temperature is 120-270° C., and a hardening time is 1-10 h;

preferably, before the kneading treatment, a temperature of the modified phenolic resin is raised to 30-50° C.;

more preferably, during the kneading treatment, the modified phenolic resin is continuously added within 10-30 min until the addition is completed, and a kneading temperature is 40-60° C.;

more preferably, a flow rate of the modified phenolic resin during continuous addition is 1-3 kg/s.

15. A carbon anode, obtaining by kneading, forming, hardening, and roasting treatment of a mixed material comprising modified phenolic resin and aggregate; or by hardening and roasting treatment of the resin carbon anode green body of any one of items 1-10; or by roasting treatment of the resin carbon anode green body intermediate of item 12.

16. The carbon anode according to item 15, wherein, the modified phenolic resin comprises lignin-modified phenolic resin, a polyphenolic compound-modified phenolic resin, a polyhydroxy compound-modified phenolic resin, or a mixture thereof;

preferably, the lignin is acidic lignin, the polyphenolic compound is one or two or more selected from the group consisting of pyrogallol, tea polyphenols, tannic acid and tannin extract, and the polyhydroxy compound is one or two or more selected from the group consisting of maltose, sucrose, glucose, fructose, oxidized starch, sorbitol, and dextrin.

17. The carbon anode according to item 15, wherein, the aggregate comprises one or more of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm;

preferably, in terms of a mass percentage of a total weight of the aggregate, the calcined coke with the particle size of 8-5 mm is 5-20 wt %, the calcined coke with the particle size of 5-3 mm is 10-25 wt %, the calcined coke with the particle size of 3-1 mm is 15-30 wt %, the calcined coke with the particle size of 1-0 mm is 10-20 wt %, and the calcined coke fine powder with the particle size of less than 0.075 mm is 25-45 wt %.

18. The carbon anode according to item 15, wherein, in a raw material of the carbon anode, in parts by weight, the modified phenolic resin is 5-15 parts, and the aggregate is 85-95 parts.

19. The carbon anode according to item 15, wherein, during the kneading treatment, a kneading time is 10-100 min, a kneading temperature is 40-60° C., and the kneading time is preferably 20-60 min;

preferably, during the kneading treatment, the modified phenolic resin is continuously added within 10-30 min until the addition is completed;

more preferably, a flow rate of the modified phenolic resin during continuous addition is 1-3 kg/s.

20. The carbon anode according to item 16, wherein, the forming treatment is carried out using an electric screw press or a vibration press.

21. The carbon anode according to item 16, wherein, during the hardening treatment: a hardening temperature is 120-270° C., and a hardening time is 1-10 h;

preferably, the roasting treatment comprises: under the carbon embedded condition, a temperature is raised from room temperature to 270° C. to 550-1100° C., and a roasting time is 20-250 h;

preferably, compared with the carbon anode green body intermediate, the carbon anode has an ignition loss of 2-6%;

more preferably, the roasting treatment is carried out under the carbon embedded condition or under a protection of inert gas;

more preferably, the roasting treatment is microwave roasting treatment, oven roasting treatment, tunnel kiln roasting treatment, inverted flame kiln roasting treatment, multi-chamber ring roasting furnace roasting treatment, Muffle furnace roasting treatment or roasting furnace roasting treatment.

22. The carbon anode according to item 21, wherein, during the roasting treatment, in the stage of room temperature to 270° C., a rate of raising temperature is 3-60° C./h; in the stage of 270-500° C., a rate of raising temperature is 3-60° C./h; in the stage of 500-800° C., a rate of raising temperature is 10-50° C./h, in the stage of 800-1100° C., a rate of raising temperature is 10-30° C./h.

23. A method of preparing the carbon anode of any one of items 15-22, comprising the following steps:

mixing materials: a mixed material comprises modified phenolic resin and aggregate;

kneading treatment: a kneading time is 10-100 min;

forming treatment: being carried out using an electric screw press or a vibration press;

hardening treatment: a hardening temperature is 120-270° C., and a hardening time is 1-10 h;

roasting treatment: a temperature is raised from room temperature to 270° C. to 550-1100° C.

24. Uses of the carbon anode of any one of items 15-22 and the carbon anode prepared by the method according to item 23 in the electrolytic production of aluminum.

The technical effect of the present invention is as follows:

(1) For the resin carbon anode green body according to the present application, after being hardened at a temperature lower than 270° C., the characteristic peaks of phenolic resin can be detected when tested by gas chromatography-mass spectrometry.

(2) The resin carbon anode green body intermediate of the present application has suitable compressive strength and volume density before high-temperature roasting, so it reduces the crack rejection rate in the roasting and improves the qualified rate of carbon anode products; at the same time, it saves the roasting time and greatly improves the production efficiency of carbon anode finished products.

(3) In the carbon anode of the present application, phenolic resin is used to replace a large amount or all of coal tar pitch, which improves the structural compactness of the carbon anode, improves the strength, and ensures the electrical conductivity of the carbon anode, so that it has good electrochemical performance, thereby improving the electrochemical reaction activity of the anode, reducing the consumption of electric energy in the electrolysis process, and improving economic benefits;

(4) In the present application, phenolic resin is used as the binder, and the material does not need to be heated up during the kneading and forming process, and the process steps are reduced; after the green carbon block is hardened and solidified, it has very high strength and dimensional stability. In the stage of 200-400° C., the temperature can be raised rapidly, which shortens the process time, reduces the production cost, and at the same time makes the entire production process and electrolysis process more environmentally friendly, which has great application prospects;

(5) The carbon anode of the present application has excellent strength and electrical conductivity, and can be used for electrolysis of alumina to improve economic benefits.

DETAIL DESCRIPTION OF THE INVENTION

The present application will be described in detail below. It should be noted that, "comprise", "include" or "contain" mentioned in the entire specification and claims are open-ended terms, and therefore should be interpreted as "comprising but not limited to . . . ". Subsequent descriptions in the specification are preferred embodiments for implementing the present application, and the descriptions are for the purpose of illustrating the general principles of the application and are not intended to limit the scope of the present application. The scope of protection of the present application should be determined by the appended claims.

In the present application, the formed phenolic resin has a hydroxyl-containing aromatic ring structural unit, which is mainly derived from a prepolymer formed by phenol and formaldehyde, and lignin, and can be represented by the following formula (I) (wherein R is hydroxymethyl or propyl, R' is methoxy or methylene), and then the molecular weight range of polymers containing a certain number of this structure can be calculated; the molecular weight and molecular weight distribution of the obtained phenolic resin are analyzed by gel permeation chromatography, the area of the molecular weight distribution of the phenolic resin polymer within a certain molecular weight range is analyzed, and the ratio of this area to the entire distribution area is calculated, that is, the percentage of the polymer in the molecular weight range to the total weight of the phenolic resin, and then the weight percentage of polymers containing a certain number of hydroxyl-containing aromatic ring structures.

The present application provides a resin carbon anode green body, and a resin carbon anode green body intermediate is obtained by hardening treatment of the resin carbon anode green body, and the resin carbon anode green body intermediate has the following spectral characteristics when tested by gas chromatography-mass spectrometry: there are characteristic peaks at the retention times of 4.95±0.3 min, 5.32±0.3 min, 5.47±0.3 min and 5.92±0.3 min.

In a specific embodiment of the present application, the resin carbon anode green body intermediate has the following spectral characteristics when tested by gas chromatography-mass spectrometry: there are characteristic peaks at the retention times of 4.95±0.3 min, 5.32±0.3 min, 5.47±0.3 min, 5.92±0.3 min, 6.10±0.3 min, 6.40±0.3 min and 6.50±0.3 min.

In a specific embodiment of the present application, the resin carbon anode green body intermediate doesn't have characteristic peak at retention times of 9.7±0.3 min, 11.6±0.3 min, 12.9±0.3 min, and 15.9±0.3 min when tested by gas chromatography-mass spectrometry, that is, no characteristic peak belonging to coal tar pitch is detected.

Figure 1:
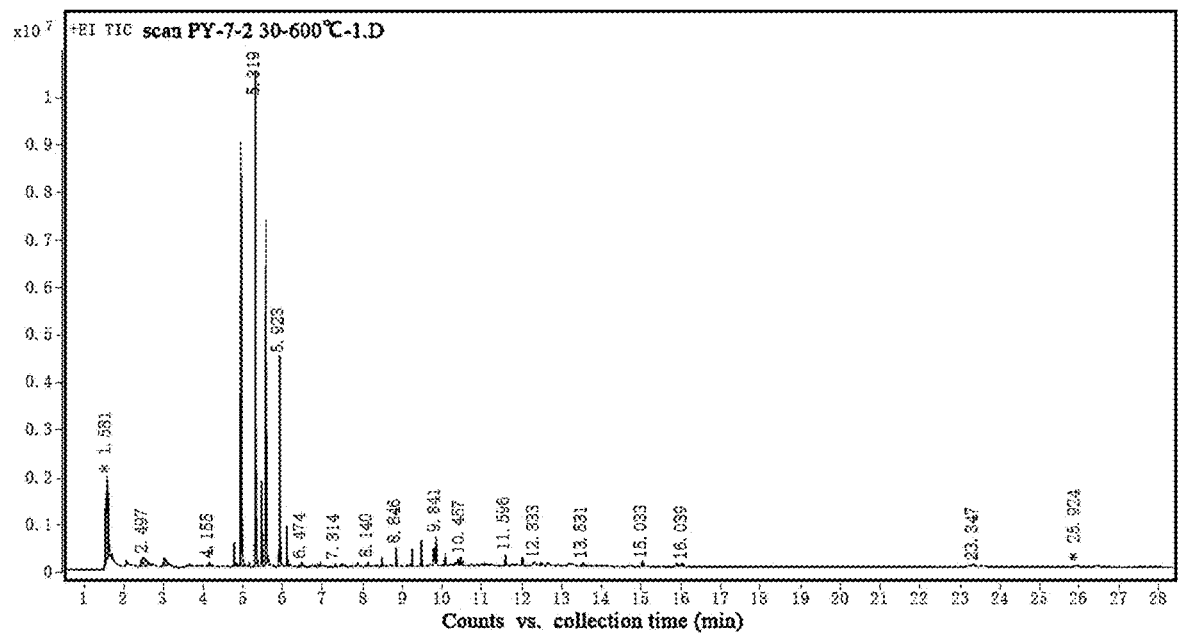
FIG. 1 shows a graph of the gas chromatography-mass spectrometry of Example 2-1.

In a specific embodiment of the present application, an analysis result of a graph of the gas chromatography-mass spectrometry of the resin carbon anode green body intermediate is shown in FIG. 1, and the specific analysis results of the characteristic peaks shown in FIG. 1 are listed in Table 1.

TABLE 1 the analysis result of the graph of the gas chromatography-mass spectrometry of the resin carbon anode green body intermediate

| Number | Retention time/min | Qualitative results |
|---|---|---|
| 1 | 1.548 | carbon dioxide, nitrogen, hydrogen sulfide |
| 2 | 1.581 | water, sulfur dioxide, chloroform |
| 3 | 1.603 | methanol, methyl mercaptan, trimethylamine |
| 4 | 1.707 | methyl acetate |
| 5 | 2.068 | acetic acid |
| 6 | 2.497 | toluene |
| 7 | 3.022 | xylene |
| 8 | 3.662 | trimethylbenzene |
| 9 | 4.155 | benzofuran |

TABLE 1-continued the analysis result of the graph of the gas chromatography-mass
spectrometry of the resin carbon anode green body intermediate

| Number | Retention time/min | Qualitative results |
|---|---|---|
| 10 | 4.249 | 4-methyl anisole |
| 11 | 4.784 | salicylaldehyde |
| 12 | 4.862 | 2-methylbenzofuran |
| 13 | 4.951 | phenol |
| 14 | 5.156 | 2-methoxyphenol |
| 15 | 5.319 | o-cresol |
| 16 | 5.475 | 2,6-xylenol |
| 17 | 5.579 | p-cresol |
| 18 | 5.642 | 5-methyl salicylaldehyde |
| 19 | 5.923 | 2,4-xylenol |
| 20 | 6.104 | tricresol |
| 21 | 6.184 | xylenol |
| 22 | 6.212 | 4-ethyl phenol |
| 23 | 6.398 | xylenol |
| 24 | 6.508 | ethyl cresol |
| 25 | 6.592 | methylnaphthalene |
| 26 | 6.876 | 2-methoxy-4-vinyl phenol |
| 27 | 6.94 | 2-hydroxybenzonitrile |
| 28 | 7.314 | diphenylmethane |
| 29 | 7.51 | p-tolyl is° C.yanate |
| 30 | 7.868 | benzyltoluene |
| 31 | 8.056 | dibenzofuran |
| 32 | 8.48 | fluorene, 4-hydroxybenzaldehyde |
| 33 | 8.846 | xanthene |
| 34 | 9.126 | methyl fluorene |
| 35 | 9.778 | phenanthrene/anthracene/9-methylenefluorene |
| 36 | 9.841 | phenanthrene/anthracene/9-methylenefluorene |
| 37 | 10.457 | methylanthracene/methylphenanthrene |
| 38 | 11.596 | fluoranthene/pyrene |
| 39 | 12.023 | fluoranthene/pyrene |
| 40 | 12.316 | 2,2'-methylene bisphenol |
| 41 | 13.198 | 4,4'-methylene bisphenol |
| 42 | 15.033 | 9-d° C.osenenitrile |
| 43 | 15.895 | terphenyl |
| 44 | 16.039 | chrysene |
| 45 | 23.347 | benzofluoranthene/benzopyrene/perylene |
| 46 | 25.924 | benzofluoranthene/benzopyrene/perylene |
| 47 | 26.468 | benzofluoranthene/benzopyrene/perylene |
| 48 | | |

In some specific embodiments of the present application, the test conditions of the gas chromatography-mass spectrometry are those known to those skilled in the art.

In some specific embodiments of the present application, the test conditions of the gas chromatography-mass spectrometry are as follows: the gas chromatography-mass spectrometer is a 7890B/5977B GC/MSD, equipped with an EGA/PY-3030D pyrolysis instrument and Masshunter acquisition and qualitative software; the chromatographic column is a VF-1701MS capillary column.

In some specific embodiments of the present application, the test conditions of the gas chromatography-mass spectrometry are as follows: the gas chromatography-mass spectrometer is an Agilent5975C-7890AGC-MS, and the chromatographic column is an HP-5MS5% PhenylMethylSilox capillary column.

In some specific embodiments of the present application, the test conditions of the gas chromatography-mass spectrometry are as follows: the gas chromatography-mass spectrometer is an Agilent5975C-7890A; the chromatography column is an HP-5MS capillary chromatography column. In some specific embodiments of the present application, the test conditions of the gas chromatography-mass spectrometry are as follows: the gas chromatography-mass spectrometer is a SHIMADU GCMS-QP2010Plus, and the chromatographic column is a DB-5HT.

In some specific embodiments of the present application, the sample testing is performed according to the instructions for use, wherein the embodiments comprise the following steps:

taking a small amount of sample and transferring it into a sample cup;

connecting the sample cup to a manual injector with a connecting rod, and fixing the injector to a pyrolysis instrument;

editing a gas chromatography injection sequence and running;

starting a running program when the pyrolysis software issues a sample injection warning, so that the sample begins to be pyrolyzed and enters a chromatographic column for separation, and is detected by mass spectrometry;

qualitatively analyzing the test results.

In some specific embodiments of the present application, the carbon anode green body is obtained by kneading and forming treatment of a mixed material comprising modified phenolic resin and aggregate.

In some specific embodiments of the present application, the modified phenolic resin comprises lignin-modified phenolic resin, a polyphenolic compound-modified phenolic resin, a polyhydroxy compound-modified phenolic resin, or a mixture thereof;

preferably, the lignin is acidic lignin, the polyphenolic compound is one or two or more selected from the group consisting of pyrogallol, tea polyphenols, tannic acid and tannin extract, and the polyhydroxy compound is one or two or more selected from the group consisting of maltose, sucrose, glucose, fructose, oxidized starch, sorbitol, and dextrin.

In a specific embodiment of the present application, the modified phenolic resin can be obtained by modification by a method known to those skilled in the art.

In a specific embodiment of the present application, the modified phenolic resin is prepared by reacting a phenolic compound, a hydroxyl compound, an aldehyde compound and a carbon-forming agent under the action of a catalyst.

In a specific embodiment of the present application, 100 parts of phenol and an appropriate amount of catalyst are put into the reaction kettle, the temperature is raised to 90-120° C., 20-100 parts of lignin are added, phenolated for 1-5 h, then the temperature is lowered to 80-82° C., 100-150 parts of 37% formaldehyde and the modifying and carbon-forming agent are added. After the addition is completed, the temperature is raised to 88-90° C., the viscosity is controlled to 100-350 cp, dehydrated to 3-9%, and the material is discharged.

In some specific embodiments of the present application, the phenolic resin modified with lignin, a polyphenolic compound and a polyhydroxy compound can be obtained by modification according to methods known to those skilled in the art.

In a specific embodiment of the present application, 100 parts of phenol and an appropriate amount of acid catalyst are put into the reaction kettle, the temperature is raised to 90-120° C., 20-100 parts of lignin are added, phenolated for 1-5 h, then the temperature is lowered to 80-82° C., 100-150 parts of 37% formaldehyde and the modifying and carbon-forming agent are added. After the addition is completed, the temperature is raised to 88-90° C., the viscosity is controlled to 100-350 cp, dehydrated to 3-9%, and the material is discharged.

In a specific embodiment of the present application, 100 parts of phenol and an appropriate amount of catalyst are put into the reaction kettle, the temperature is raised to 90-100°

C., 10-60 parts of fructose and 10-20 parts of resorcinol are added, and the temperature is kept constant for 1-2 h, then the temperature is lowered to 80-82° C., 100-150 parts of 37% formaldehyde and the modifying and carbon-forming agent are added. After the addition is completed, the temperature is raised to 90-95° C., the viscosity is controlled to 100-350 cp, dehydrated to 3-9%, and the material is discharged.

In a specific embodiment of the present application, 100 parts of phenol and an appropriate amount of catalyst are put into the reaction kettle, the temperature is raised to 80-90° C., 110-180 parts of 37% formaldehyde and the modifying and carbon-forming agent are added. After the addition is completed, the temperature is raised to 90-95° C., and the temperature is kept constant for 1-3 h, then 30-70 parts of tannin extract are added, the viscosity is controlled to 100-350 cp, dehydrated to 3-9%, and the material is discharged.

In a specific embodiment of the present application, the phenolic resin of the present application, based on the total weight of the modified phenolic resin, contains about 0.2-1.5% by weight of the carbon-forming agent, and the carbon-forming agent is one or more of the compounds soluble in water or phenolic resins formed by boron element or transition elements, and the transition elements do not include Group IB and IIB elements, and the transition elements can be an element such as iron, manganese, cobalt, titanium, nickel and molybdenum. The carbon-forming agent can be, for example, ferric ammonium citrate, manganese nitrate, cobalt sulfate, ferric chloride, nickel perchlorate, ammonium molybdate, nickel acetate, and the like. In the present application, the percentage of the carbon-forming agent in the phenolic resin can be calculated according to the amount of the added carbon-forming agent and the total amount of all the reaction components that form the phenolic resin, or can be detected based on a method well known to those skilled in the art for the content of the selected carbon-forming agent in the phenolic resin. The added carbon-forming agent can form a fusion compound with carbon at high temperature, and through the rearrangement of the internal atoms of the compound, the carbon is precipitated as a crystallization of graphite, which can improve the electrical conductivity of the anode to a certain extent.

In a preferred embodiment of the present application, the modified phenolic resin is prepared by reacting a phenolic compound, an aldehyde compound, lignin and a modifying agent under the action of a basic catalyst, wherein, the phenolic compound can be phenol, cresol, cardanol, resorcinol, alkylphenol, xylenol, octylphenol, nonylphenol, tert-butylphenol, cashew nut oil, or bisphenol A, etc., and the aldehyde compound can be formaldehyde, trioxymethylene, paraformaldehyde, acetaldehyde, paraldehyde, butyraldehyde, furfural, or benzaldehyde, etc.

In a specific embodiment of the present application, the lignin is prepared from phenol, dioxane, acidic lignin and polyhydroxy compounds.

In some embodiments of the present application, the aggregate comprises one or more of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm; The calcined coke with the particle size of 8-5 mm refers to calcined coke with a particle diameter of 8-5 mm; the calcined coke with the particle size of 5-3 mm refers to calcined coke with a particle diameter of 5-3 mm; the calcined coke with the particle size of 3-1 mm refers to calcined coke with a particle diameter of 3-1 mm; the calcined coke with the particle size of 1-0 mm refers to calcined coke with a particle diameter of 1-0 mm; the calcined coke fine powder with a particle size of less than 0.075 mm refers to a calcined coke fine powder with a particle diameter of less than 0.075 mm.

In some embodiments of the present application, in terms of the mass percentage of the total weight of the aggregate, the calcined coke with the particle size of 8-5 mm is 5-20 wt %, the calcined coke with the particle size of 5-3 mm is 10-25 wt %, the calcined coke with the particle size of 3-1 mm is 15-30 wt %, the calcined coke with the particle size of 1-0 mm is 10-20 wt %, and the calcined coke fine powder with the particle size of less than 0.075 mm is 25-45 wt %.

For example, the mass percentage of the total weight of the calcined coke with the particle size of 8-5 mm can be 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, or in any range obtained by combination between the values;

The mass percentage of the total weight of the calcined coke with the particle size of 5-3 mm can be 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, or in any range obtained by combination between the values;

The mass percentage of the total weight of the calcined coke with the particle size of 3-1 mm can be 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, or in any range obtained by combination between the values;

The mass percentage of the total weight of the calcined coke with the particle size of 1-0 mm can be 10 wt %, 11 wt %, 12 wt %, 13 wt %, 14 wt %, 15 wt %, 16 wt %, 17 wt %, 18 wt %, 19 wt %, 20 wt %, or in any range obtained by combination between the values;

The mass percentage of the total weight of the calcined coke fine powder with the particle size of less than 0.075 mm can be 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, or in any range obtained by combination between the values.

In some embodiments of the present application, in a raw material of the resin carbon anode green body, in parts by weight, the modified phenolic resin is 5-15 parts, the aggregate is 85-95 parts;

For example, the weight part of the modified phenolic resin can be 5 parts, 6 parts, 7 parts, 8 parts, 9 parts, 10 parts, 11 parts, 12 parts, 13 parts, 14 parts, 15 parts, or in any range obtained by combination between the values;

The weight part of the aggregate can be 85 parts, 86 parts, 87 parts, 88 parts, 89 parts, 90 parts, 91 parts, 92 parts, 93 parts, 94 parts, 95 parts, or in any range obtained by combination between the values.

In some embodiments of the present application, before the kneading treatment, the temperature of the modified phenolic resin is raised to 30-50° C.;

For example, the temperature of the modified phenolic resin can be raised to 30° C., 35° C., 40° C., 45° C., 50° C., or any range obtained by combination between the values.

In some embodiments of the present application, during the kneading treatment, the modified phenolic resin is continuously added within 10-30 min until the addition is completed; preferably, a flow rate of the modified phenolic resin during continuous addition is 1-3 kg/s.

In some embodiments of the present application, the kneading temperature is 40-60° C., for example, the kneading temperature can be 40° C., 45° C., 50° C., 55° C., 60° C., or in any range obtained by combination between the values.

In some embodiments of the present application, during the kneading treatment, the kneading time is 10-100 min, preferably 20-60 min. Specifically, the kneading machine is used for kneading for 10-100 min, and the kneading time in the present application is used to ensure the stability of the process. If the kneading time is less than 10 min, the mixed material composed of the modified phenolic resin and the aggregate will not be fully mixed and wetted, which will seriously affect the stability of the product and be unfavorable for subsequent processes; but when the kneading time exceeds 100 min, such as 120 min, the long kneading time will cause the pre-curing of the modified phenolic resin and affect the forming performance and the strength of the product.

In some embodiments of the present application, the forming treatment is carried out using an electric screw press or a vibration press.

In some embodiments of the present application, during the hardening treatment, the hardening temperature is 120-270° C., and the hardening time is 1-10 h. In the present application, the hardening temperature cannot exceed 270° C., for example, when the hardening temperature is 300° C., the surface of the carbon block will be oxidized; and the hardening time should not be too long, which is not conducive to forming.

For example, the hardening temperature can be 120° C., 130° C., 140° C., 150° C., 160° C., 170° C., 180° C., 190° C., 200° C., 210° C., 220° C., 230° C., 240° C., 250° C., 260° C., 270° C., or in any range obtained by combination between the values;

The hardening time can be 1 h, 2 h, 3 h, 4 h, 5 h, 6 h, 7 h, 8 h, 9 h, 10 h, or in any range obtained by combination between the values.

In some specific embodiments of the present application, the resin carbon anode green body is obtained by the kneading and forming treatment of the mixed material comprising modified phenolic resin and aggregate, and then subjected to a test of the gas chromatography-mass spectrometry after hardening treatment; wherein the hardening temperature is 120-270° C., and the pyrolysis temperature selected for the test is 600° C.

The present application provides a method for preparing the above-mentioned resin carbon anode green body, wherein, the method comprising:

mixing materials: the mixed material comprises modified phenolic resin and aggregate;

kneading treatment: the kneading time is 10-100 min;

forming treatment: being carried out using an electric screw press or a vibration press;

preferably, before the kneading treatment, the temperature of the modified phenolic resin is raised to 30-50° C.;

more preferably, during the kneading treatment, the modified phenolic resin is continuously added within 10 min-30 min until the addition is completed, and a kneading temperature is 40-60° C.;

more preferably, a flow rate of the modified phenolic resin during continuous addition is 1-3 kg/s.

The present application provides a resin carbon anode green body intermediate, which is obtained by hardening treatment of the above mentioned green body, wherein the hardening temperature is 120-270° C., and the hardening time is 1-10 h.

In some specific embodiments of the present application, the content of the volatile component of the green body intermediate is 0.4%-2%.

Particularly, the content of the volatile component refers to the weight percentage lost after the hardening treatment of the carbon anode green body.

In the present application, the content of the volatile component is the ratio of the weight difference between the weight of the formed carbon anode green body and the green body intermediate obtained after hardening treatment to the weight of the formed carbon anode green body.

In some specific embodiments of the present application, the volume density of the green body intermediate is 1.6-1.8 g/m$^3$;

preferably, the volume density of the green body intermediate is 1.69-1.75 g/m$^3$.

Particularly, the volume density refers to the density of volume. In the present application, the volume density is obtained by calculating the ratio of the weight of the carbon anode green body intermediate to the volume of the green body intermediate. The test method of the volume density refers to GBT 24528-2009 "Carbon Material Volume Density Test Methods".

In some specific embodiments of the present application, the resin carbon anode green body intermediate is obtained by kneading, forming and hardening treatment of the mixed material comprising modified phenolic resin and aggregate, and then subjected to a test of the gas chromatography-mass spectrometry; wherein the hardening temperature is 120-270° C., and the pyrolysis temperature selected for the test is 600° C.

The present application provides a carbon anode, which is obtained by kneading, forming, hardening and roasting treatment of a mixed material comprising modified phenolic resin and aggregate.

In some specific embodiments of the present application, the modified phenolic resin comprises lignin-modified phenolic resin, a polyphenolic compound-modified phenolic resin, a polyhydroxy compound-modified phenolic resin, or a mixture thereof;

preferably, the lignin is acidic lignin, the polyphenolic compound is one or two or more selected from the group consisting of pyrogallol, tea polyphenols, tannic acid and tannin extract, and the polyhydroxy compound is one or two or more selected from the group consisting of maltose, sucrose, glucose, fructose, oxidized starch, sorbitol, and dextrin.

The technical process of preparing the modified phenolic resin is as described above and will not be repeated here.

In some embodiments of the present application, the aggregate comprises one or more of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm.

The specifications of the calcined coke with the particle size of 8-5 mm, the calcined coke with the particle size of 5-3 mm, the calcined coke with the particle size of 3-1 mm, the calcined coke with the particle size of 1-0 mm, and the calcined coke fine powder with the particle size less than 0.075 mm are as described above and will not be repeated here.

In some embodiments of the present application, in terms of the mass percentage of the total weight of the aggregate, the calcined coke with the particle size of 8-5 mm is 5-20 wt %, the calcined coke with the particle size of 5-3 mm is 10-25 wt %, the calcined coke with the particle size of 3-1 mm is 15-30 wt %, the calcined coke with the particle size of 1-0 mm is 10-20 wt %, and the calcined coke fine powder with the particle size of less than 0.075 mm is 25-45 wt %.

In some embodiments of the present application, in a raw material of the carbon anode, in parts by weight, the modified phenolic resin is 5-15 parts, and the aggregate is 85-95 parts.

In some embodiments of the present application, the forming treatment is carried out using an electric screw press or a vibration press.

In some specific embodiments of the present application, the hardening temperature is 120-270° C., and the hardening time is 1-10 h.

In some specific embodiments of the present application, the roasting treatment comprises:
under the carbon embedded condition, a temperature is raised from room temperature to 270° C. to 550-1100° C., and the roasting time is 20-250 h.

In some specific embodiments of the present application, the roasting treatment is microwave roasting treatment, oven roasting treatment, tunnel kiln roasting treatment, inverted flame kiln roasting treatment, multi-chamber ring roasting furnace roasting treatment, Muffle furnace roasting treatment or roasting furnace roasting treatment.

In some specific embodiments of the present application, during the roasting treatment, in the stage of room temperature to 270° C., the rate of raising temperature is 3-60° C./h; in the stage of 270-500° C., the rate of raising temperature is 3-60° C./h; in the stage of 500-800° C., the rate of raising temperature is 10-50° C./h, in the stage of 800-1100° C., the rate of raising temperature is 10-30° C./h.

The present application provides a method for preparing the above-mentioned carbon anode, wherein, the method comprising:
mixing materials: a mixed material comprises modified phenolic resin and aggregate;
kneading treatment: a kneading time is 10-100 min;
forming treatment: being carried out using an electric screw press or a vibration press;
hardening treatment: the hardening temperature is 120-270° C., and the hardening time is 1-10 h;
roasting treatment: the temperature is raised from room temperature to 270° C. to 550-1100° C. preferably, the roasting treatment comprises: under the carbon embedded condition, the temperature is raised from room temperature to 270° C. to 550-1100° C., and the roasting time is 20-250 h;
preferably, the roasting treatment is microwave roasting treatment, oven roasting treatment, tunnel kiln roasting treatment, inverted flame kiln roasting treatment, multi-chamber ring roasting furnace roasting treatment, Muffle furnace roasting treatment or roasting furnace roasting treatment.

In some specific embodiments of the present application, during the kneading treatment, the modified phenolic resin is continuously added within 10-30 min until the addition is completed; preferably, a flow rate of the modified phenolic resin during continuous addition is 1-3 kg/s.

In some specific embodiments of the present application, before the kneading treatment, the temperature of the modified phenolic resin is raised to 30-50° C.

The present application provides a carbon anode prepared from the above-mentioned resin carbon anode green body.

The present application provides a method for preparing a carbon anode from the above-mentioned resin carbon anode green body, wherein the carbon anode is obtained by hardening and roasting treatment of the resin carbon anode green body;

The roasting treatment comprises: under the carbon embedded condition, the temperature is raised from room temperature to 270° C. to 550-1100° C., and the roasting time is 20-250 h.

In some embodiments of the present application, the carbon anode has an ignition loss of 2-6% relative to the carbon anode green body intermediate.

Particularly, the ignition loss refers to the weight percentage lost after the roasting treatment of the carbon anode green body intermediate. In the present application, the ignition loss is the ratio of the weight difference between the weight of the formed carbon anode green body intermediate and the carbon anode finished product obtained after roasting to the weight of the carbon anode green body intermediate body.

The present application provides a carbon anode prepared from the above-mentioned resin carbon anode green body intermediate.

The present application provides a method for preparing a carbon anode from the above-mentioned resin carbon anode green body intermediate, wherein the carbon anode is obtained by roasting treatment of the resin carbon anode green body intermediate;

The roasting treatment comprises: under the carbon embedded condition, the temperature is raised from room temperature to 270° C. to 550-1100° C., and the roasting time is 20-250 h.

The present application also provides a use of the above-mentioned carbon anode in the production of electrolytic aluminum.

After hardening treatment of the resin carbon anode green body according to the present application, the characteristic absorption peaks of phenolic resin can be detected when tested by the gas chromatography-mass spectrometry, and a carbon anode can be obtained by hardening and roasting treatment of the resin carbon anode green body, and the obtained carbon anode has small fluctuation in volume density and compressive strength and more stable quality.

EXAMPLES

The present application generally and/or specifically describes the materials and test methods used in the test. In the following examples, unless otherwise specified, % represents wt %, that is, weight percentage. The reagents or instruments used without specifying the manufacturer are all commercially available conventional reagent products, wherein, the sources of the raw materials used in the examples are listed in Table 2.

TABLE 2

Sources of the raw materials used in the examples

| Raw material | Model/Purity | Manufacturer |
|---|---|---|
| lignin | industrial use | commercially available |
| calcined coke | industrial use | commercially available |
| catalyst | industrial use | Tianjin Damao Chemical Reagent Factory |

TABLE 2-continued

Sources of the raw materials used in the examples

| Raw material | Model/Purity | Manufacturer |
|---|---|---|
| phenolic resin | industrial use | Shandong Shengquan New Material Co., Ltd. |
| coal tar pitch powder | industrial use | commercially available |

Example 1-1 Preparation of Resin Carbon Anode Green Body (a) Preparation of aggregate: 10 parts of calcined coke with a particle size of 8-5 mm, 15 parts of calcined coke with a particle size of 5-3 mm, 20 parts of calcined coke with a particle size of 3-1 mm, 10 parts of calcined coke with a particle size of 1-0 mm, and 40 parts of fine powder calcined coke with a particle size of less than 0.075 mm are weighed and put into a mixer and mixed evenly.

(b) Preparation of lignin-modified phenolic resin: 100 parts of phenol and an appropriate amount of acid catalyst are put into the reaction kettle, the temperature is raised to 100° C., 70 parts of lignin are added, phenolated for 2 h, then the temperature is lowered to 80-82° C., 130 parts of 37% formaldehyde and the modifying and carbon-forming agent are added. After the addition is completed, the temperature is raised to 88-90° C., the viscosity is controlled to 180-280 cp, dehydrated to 4-7%, and the material is discharged.

(c) The temperature of the modified phenolic resin obtained in step (b) is to raised to 40° C., 95 parts of the aggregate obtained in step (a) and 10 parts of the modified phenolic resin obtained in step (b) are mixed, the modified phenolic resin is continuously added within 20 minutes, the flow rate of the modified phenolic resin is 2 kg/s until the addition is completed, a kneader is used for kneading treatment, the kneading time is 30 minutes, and the kneading temperature is 50° C.

(d) The mixed material kneaded in step (c) is placed in a specific mold, and is pressed and formed under the pressure of 2500 tons using an electric screw press to obtain the carbon anode green resin.

Example 1-2 Preparation of Resin Carbon Anode Green Body

The only difference between Example 1-2 and Example 1-1 is that: in step (c), the kneading time is 10 min, and other conditions are the same.

Example 1-3 Preparation of Resin Carbon Anode Green Body

The only difference between Example 1-3 and Example 1-1 is that: in step (c), the kneading time is 100 min, and other conditions are the same.

Example 1-4 Preparation of Resin Carbon Anode Green Body

The only difference between Example 1-4 and Example 1-1 is that: in step (c), the kneading time is 120 min, and other conditions are the same.

Example 1-5 Preparation of Resin Carbon Anode Green Body

The only difference between Example 1-5 and Example 1-1 is that: in step (c), the temperature of the modified phenolic resin is not raised to 40° C., that is, at room temperature, 95 parts of the aggregate obtained in step (a) and 10 parts of the modified phenolic resin obtained in step (b) are mixed, a kneader is used for kneading treatment, the kneading time is 30 min, and the kneading temperature is 50° C.

Example 1-6 Preparation of Resin Carbon Anode Green Body

The only difference between Example 1-6 and Example 1-1 is that: in step (c), the temperature of the modified phenolic resin obtained in step (b) is raised to 40° C., 95 parts of the aggregate obtained in step (a) and 10 parts of the modified phenolic resin obtained in step (b) are mixed, the modified phenolic resin is all added at one time, and a kneader is used for kneading treatment, the kneading time is 30 min, and the kneading temperature is 50° C.

Example 1-7 Preparation of Resin Carbon Anode Green Body

The only difference between Example 1-7 and Example 1-1 is that: the composition of the aggregate is different, specifically as follows:

step (a): preparation of aggregate: in parts by weight, 20 parts of calcined coke with a particle size of 0-1 mm, 20 parts of calcined coke with a particle size of 1-2 mm, 20 parts of calcined coke with a particle size of 2-4 mm, 15 parts of calcined coke with a particle size of 4-8 mm, 30 parts of 180-mesh calcined coke fine powder, 5 parts of crushed graphite, and 5 parts of carbon nanotubes are weighed and put into a mixer and mixed evenly.

Example 1-8 Preparation of Resin Carbon Anode Green Body

The only difference between Example 1-8 and Example 1-1 is that: in step (c), the kneading temperature is room temperature, and other conditions are the same.

Comparative Example 1-1

(a) Preparation of aggregate: 10 parts of calcined coke with a particle size of 8-5 mm, 15 parts of calcined coke with a particle size of 5-3 mm, 20 parts of calcined coke with a particle size of 3-1 mm, 10 parts of calcined coke with a particle size of 1-0 mm, and 40 parts of calcined coke fine powder with a particle size of less than 0.075 mm are weighed and put into a mixer and mixed evenly.

(b) The temperature of 95 parts of the aggregate obtained in step (a) is raised to 150° C., 10 parts of coal tar pitch powder preheated to 140° C. is added, and kneaded at 140° C. for 30 minutes.

(c) The mixed material kneaded in step (b) is placed in a specific mold, and is pressed and formed using a vibration forming machine.

The important parameters of Examples 1-1 to 1-8 and Comparative Example 1-1 are shown in Table 3.

TABLE 3

| | Modified phenolic resin/part | Aggregate/part | During kneading treatment, the temperature to which the modified phenolic resin is raised | Flow rate of the phenolic resin kg/s | Kneading time | Kneading temperature |
|---|---|---|---|---|---|---|
| Example 1-1 | Lignin-modified phenolic resin/10 | 95 | 40° C. | 2 | 30 min | 50° C. |
| Example 1-2 | Lignin-modified phenolic resin/10 | 95 | 40° C. | 2 | 10 min | 50° C. |
| Example 1-3 | Lignin-modified phenolic resin/10 | 95 | 40° C. | 2 | 100 min | 50° C. |
| Example 1-4 | Lignin-modified phenolic resin/10 | 95 | 40° C. | 2 | 120 min | 50° C. |
| Example 1-5 | Lignin-modified phenolic resin/10 | 95 | room temperature | — | 30 min | 50° C. |
| Example 1-6 | Lignin-modified phenolic resin/10 | 95 | 40° C. | add all at once | 30 min | 50° C. |
| Example 1-7 | Lignin-modified phenolic resin/10 | 95 (Different from the aggregate composition of Example 1-1) | 40° C. | 2 | 30 min | 50° C. |
| Example 1-8 | Lignin-modified phenolic resin/10 | 95 | 40° C. | 2 | 30 min | room temperature |
| Comparative Example 1-1 | 10 parts of coal tar pitch powder to replace lignin-modified phenolic resin | 95 | — | — | 30 min | 50° C. |

Example 2-1 Preparation of Resin Carbon Anode Green Body Intermediate

The resin carbon anode green body prepared in Example 1-1 is subjected to hardening treatment, wherein, during the hardening treatment, the hardening temperature is 150° C., and the hardening time is 3 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 1.05%.

The resin carbon anode green body intermediate obtained in Example 2-1 is then analyzed by gas chromatography-mass spectrometry, and the resin carbon anode green body intermediate has a graph of the gas chromatography-mass spectrometry as shown in FIG. 1.

Example 2-2 Preparation of Resin Carbon Anode Green Body Intermediate

The resin carbon anode green body prepared in Example 1-5 is subjected to hardening treatment, wherein, during the hardening treatment, the hardening temperature is 150° C., and the hardening time is 3 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 1.02%.

Example 2-3 Preparation of Resin Carbon Anode Green Body Intermediate

The resin carbon anode green body prepared in Example 1-6 is subjected to hardening treatment, wherein, during the hardening treatment, the hardening temperature is 150° C., and the hardening time is 3 h, that is, the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 0.98%.

Example 2-4 Preparation of Resin Carbon Anode Green Body Intermediate

The resin carbon anode green body prepared in Example 1-7 is subjected to hardening treatment, wherein, during the hardening treatment, the hardening temperature is 150° C., and the hardening time is 3 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 0.97%.

Example 2-5 Preparation of Resin Carbon Anode Green Body Intermediate

The resin carbon anode green body prepared in Example 1-8 is subjected to hardening treatment, wherein, during the hardening treatment, the hardening temperature is 150° C., and the hardening time is 3 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 0.98%.

Example 2-6 Preparation of Resin Carbon Anode Green Body Intermediate

The resin carbon anode green body prepared in Example 1-1 is subjected to hardening treatment, wherein, during the hardening treatment, the hardening temperature is 300° C., and the hardening time is 2 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 1.3%.

Example 2-7 Preparation of Resin Carbon Anode Green Body Intermediate

The resin carbon anode green body prepared in Example 1-1 is subjected to hardening treatment, wherein, during the hardening treatment, the hardening temperature is 90° C., and the hardening time is 12 h, and the resin carbon anode green body intermediate is obtained. The weights of the green body intermediate before and after the hardening treatment are respectively detected, based on the weight difference before and after the hardening treatment, the content of the volatile component of the green body intermediate is calculated. The results showed that the content of the volatile component of the green body intermediate is 0.4%.

Example 2-8

The only difference between Example 2-8 and Example 2-1 is that: the hardening time is 8 h, and the content of the volatile component of the green body intermediate is 1.3%.

Example 2-9

The only difference between Example 2-9 and Example 2-1 is that: the hardening time is 30 min, and the content of the volatile component of the green body intermediate is 0.3%.

Comparative Example 2-1

The pressed-formed carbon anode green body intermediate in Comparative Example 1-1 is water-cooled for 12 h, and then naturally dried and analyzed by the gas chromatography-mass spectrometry.

Figure 2:
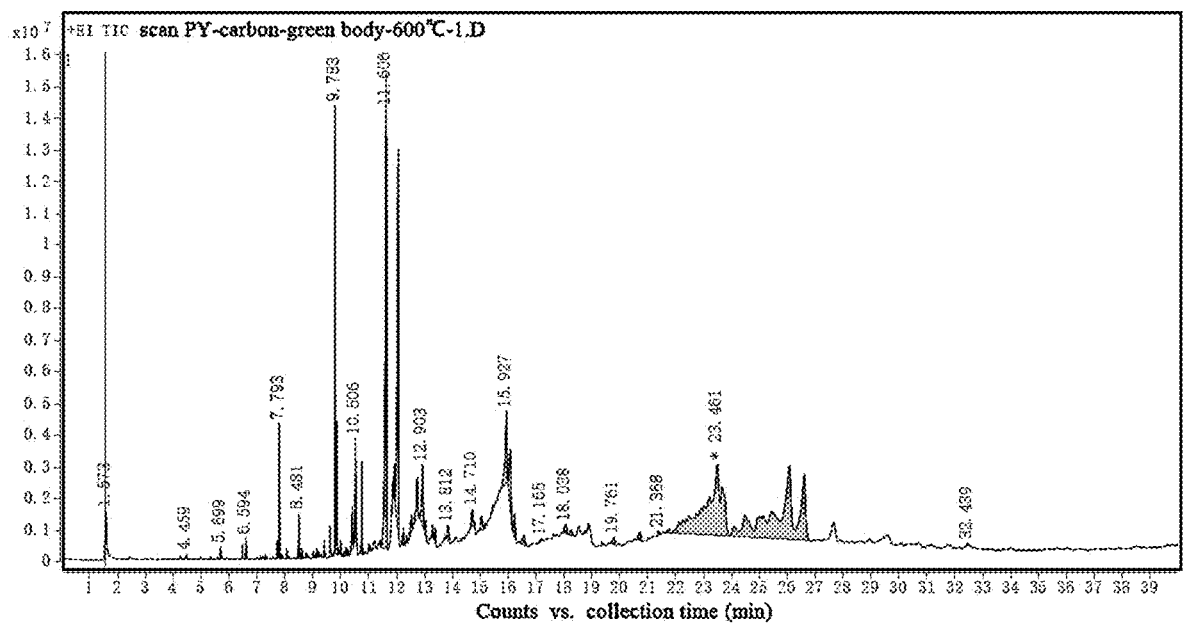
FIG. 2 shows a graph of the gas chromatography-mass spectrometry of Comparative Example 2-1.

The carbon anode green body intermediate obtained in Comparative Example 2-1 is then analyzed by gas chromatography-mass spectrometry, and the resin carbon anode green body intermediate has a graph of the gas chromatography-mass spectrometry as shown in FIG. 2.

TABLE 4

Important implementation parameters of Examples 2-1 to 2-9 and Comparative Example 2-1

| | Source of green body | Hardening temperature | Hardening time | The content of the volatile component |
|---|---|---|---|---|
| Example 2-1 | Example 1-1 | 150° C. | 3 h | 1.05% |
| Example 2-2 | Example 1-5 | 150° C. | 3 h | 1.02% |
| Example 2-3 | Example 1-6 | 150° C. | 3 h | 0.98% |
| Example 2-4 | Example 1-7 | 150° C. | 3 h | 0.97% |
| Example 2-5 | Example 1-8 | 150° C. | 3 h | 0.98% |
| Example 2-6 | Example 1-1 | 300° C. | 2 h | 1.3% |
| Example 2-7 | Example 1-1 | 90° C. | 12 h | 0.4% |
| Example 2-8 | Example 1-1 | 150° C. | 8 h | 1.3% |
| Example 2-9 | Example 1-1 | 150° C. | 0.5 | 0.3% |

Example 3-1 Preparation of Carbon Anode

The resin carbon anode green body intermediate prepared in Example 2-1 is placed in a tunnel kiln for roasting treatment, wherein, under the carbon embedded condition, the temperature is raised from room temperature to 1000° C., in the stage of room temperature to 270° C., the rate of raising temperature is 50° C./h; in the stage of 270-500° C., the rate of raising temperature is 40° C./h; in the stage of 500-800° C., the rate of raising temperature is 30° C./h, in the stage of 800-1100° C., the rate of raising temperature is 25° C./h, the roasting time is 72 h, the weights of the carbon anode green body intermediate before roasting and the finished carbon anode obtained after roasting are respectively weighed, and the ignition loss of the carbon anode is calculated to be 3.2% based on the difference in weight between the two.

After the roasting treatment is completed, the temperature is slowly lowered, and the kiln is discharged to obtain the carbon anode.

Example 3-2

The resin carbon anode green body intermediate prepared in Example 2-2 is placed in a tunnel kiln for roasting treatment. The conditions of the roasting treatment are the same as those in Example 3-1. The ignition loss of the carbon anode is 3.2%.

Example 3-3

The resin carbon anode green body intermediate prepared in Example 2-3 is placed in a tunnel kiln for roasting treatment. The conditions of the roasting treatment are the same as those in Example 3-1. The ignition loss of the carbon anode is 3.3%.

Example 3-4

The resin carbon anode green body intermediate prepared in Example 2-4 is placed in a tunnel kiln for roasting treatment, wherein the conditions of the roasting treatment are the same as those in Example 3-1, and the ignition loss of the carbon anode is 2.8%.

Example 3-5

The resin carbon anode green body intermediate prepared in Example 2-5 is placed in a tunnel kiln for roasting treatment, wherein the conditions of the roasting treatment are the same as those in Example 3-1, and the ignition loss of the carbon anode is 3.3%.

Example 3-6

The resin carbon anode green body intermediate prepared in Example 2-6 is placed in a tunnel kiln for roasting treatment, wherein the conditions of the roasting treatment are the same as those in Example 3-1, and the ignition loss of the carbon anode is 2.9%.

Example 3-7

The resin carbon anode green body intermediate prepared in Example 2-7 is placed in a tunnel kiln for roasting treatment, wherein the conditions of the roasting treatment are the same as those in Example 3-1, and the ignition loss of the carbon anode is 3.8%.

Example 3-8

The resin carbon anode green body intermediate prepared in Example 2-8 is placed in a tunnel kiln for roasting treatment, wherein the conditions of the roasting treatment are the same as those in Example 3-1, and the ignition loss of the carbon anode is 3.0%.

Example 3-9

The resin carbon anode green body intermediate prepared in Example 2-9 is placed in a tunnel kiln for roasting treatment, wherein the conditions of the roasting treatment are the same as those in Example 3-1, and the ignition loss of the carbon anode is 4.0%.

Example 3-10

The resin carbon anode green body intermediate prepared in Example 2-1 is placed in a tunnel kiln for roasting treatment, wherein the conditions of the roasting treatment are: under the carbon embedded condition, the temperature is raised from room temperature to 780° C., wherein in the stage of room temperature to 270° C., the rate of raising temperature is 50° C./h; in the stage of 270-500° C., the rate of raising temperature is 40° C./h; in the stage of 500-780° C., the rate of raising temperature is 30° C./h, the roasting time is 72 h, the carbon anode green body intermediate before roasting and the finished carbon anode obtained after roasting are respectively weighed, and the ignition loss of the carbon anode is calculated to be 2.7% based on the difference in weight between the two.

Comparative Example 3-1

The carbon anode green body intermediate prepared in Comparative Example 2-1 is placed in a tunnel kiln for roasting treatment, wherein the conditions of the roasting treatment are the same as those in Example 3-1, and the ignition loss is 6.8%

Figure 3:
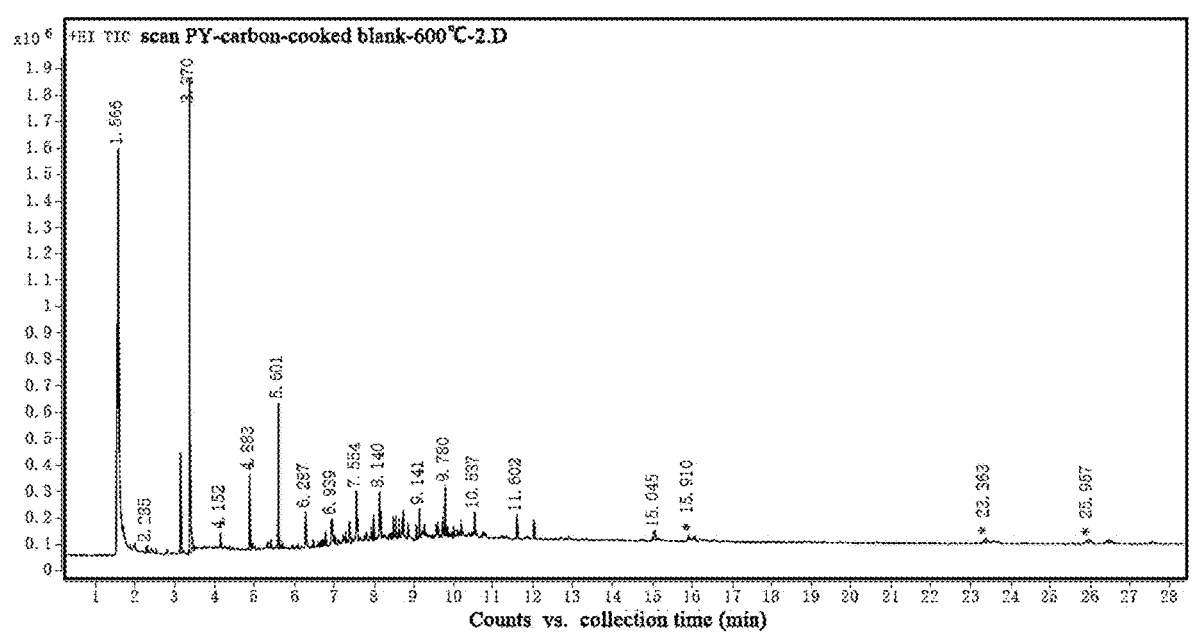
FIG. 3 shows a graph of the gas chromatography-mass spectrometry of Comparative Example 3-1.

The carbon anode green body intermediate obtained in Comparative Example 3-1 is then analyzed by gas chromatography-mass spectrometry, and the carbon anode green body intermediate has a graph of the gas chromatography-mass spectrometry as shown in FIG. 3.

Comparative Example 3-2

The carbon anode green body intermediate prepared in Example 2-1 is placed in a tunnel kiln for roasting treatment, wherein the conditions of the roasting treatment are as follows: under the carbon embedded condition, the temperature is raised from room temperature to 500° C., in the stage of room temperature to 270° C., the rate of raising temperature is 50° C./h; in the stage of 270-500° C., the rate of raising temperature is 40° C./h, the roasting time is 72 h, and the ignition loss is 1.8%.

TABLE 5

Experimental parameters of Examples 3-1 to 3-7 and Comparative Example 3-1

| | Source of green body intermediates | Roasting method |
|---|---|---|
| Example 3-1 | Example 2-1 | under the carbon embedded condition, the temperature is raised from room temperature to 1000° C., wherein, in the stage of room temperature to 270° C., the rate of raising temperature is 50° C./h; in the stage of 270-500° C., the rate of raising temperature is 40° C./h; in the stage of 500-800° C., the rate of raising temperature is 30° C./h, in the stage of 800-1100° C., the rate of raising temperature is 25° C./h, and the roasting time is 72 h |
| Example 3-2 | Example 2-2 | Same as Example 3-1 |
| Example 3-3 | Example 2-3 | Same as Example 3-1 |
| Example 3-4 | Example 2-4 | Same as Example 3-1 |
| Example 3-5 | Example 2-5 | Same as Example 3-1 |
| Example 3-6 | Example 2-6 | Same as Example 3-1 |
| Example 3-7 | Example 2-7 | Same as Example 3-1 |
| Example 3-8 | Example 2-8 | Same as Example 3-1 |
| Example 3-9 | Example 2-9 | Same as Example 3-1 |
| Example 3-10 | Example 2-1 | under the carbon embedded condition, a temperature is raised from room temperature to 780° C., wherein, in the stage of room temperature to 270° C., the rate of raising temperature is 50° C./h; in the stage of 270-500° C., the rate of raising temperature is 40° C./h, and in the stage of 500-780° C., the rate of raising temperature is 30° C./h, and the roasting time is 72 h |
| Comparative Example 3-1 | Comparative Example 2-1 | Same as Example 3-1 |
| Comparative Example 3-2 | Example 2-1 | under the carbon embedded condition, the temperature is raised from room temperature to 500° C., wherein, in the stage of room temperature-270° C., the rate of raising temperature is 50° C./h; in the stage of 270-500° C., the rate of raising temperature is 40° C./h, and the roasting time is 72h |

Experimental Example 1

When the product obtained in the present application is tested by gas chromatography-mass spectrometry, the parameters are as follows:

1. Instruments and Reagents 1.1 Gas chromatograph-mass spectrometer: 7890B/5977B GC/MSD, equipped with EGA/PY-3030D pyrolysis instrument and Masshunter acquisition and qualitative software;

1.2 Chromatographic column: VF-1701MS capillary column (30 m*0.150 mm*0.15 μm);

1.3 High-purity helium gas: 99.999%;

1.4 Sample cup: Eco-Cup LF;

1.5 Connecting rod: Eco-Stick SF;

1.6 Manual injector;

1.7 Sample spoons.

2. Detection method
2.1 Chromatographic method
2.1.1 Inlet temperature: 270° C.;
2.1.2 Flow rate of column 1: 1 mL/min;
2.1.3 Split ratio: 80:1;
2.1.4 Column oven temperature: the initial temperature is 60° C. and kept for 0 min; the temperature is raised to 260° C. at a heating rate of 20° C./min and kept for 30 min.
2.1.5 MSD transfer line temperature: 260° C.
2.2 Mass spectrometry method
2.2.1 Ion source temperature: 230° C.;
2.2.2 Quadrupole temperature: 150° C.;
2.2.3 Ion source: Inert EI source;
2.2.4 Ionization energy: 70 eV;
2.2.3 Solvent delay: 0 min;
2.2.4 Acquisition mode: scan;
2.2.5 Scanning range m/z: 10-500 amu;
2.3 Pyrolysis method
2.3.1 Pyrolysis mode: single click;
2.3.2 Pyrolysis temperature: 600° C.;
2.3.3 Pyrolysis time: 0.2 min;
3. Sample testing
3.1 Run the gas chromatography, mass spectrometry, and pyrolysis instrument to get the instruments ready.
3.2 Using the sample spoon to take a small amount of sample and transfer it into the sample cup.
3.3 Connecting the sample cup to the manual injector with a connecting rod, and fixing the injector to the pyrolysis instrument.
3.4 Editing the gas chromatography injection sequence and running, click "Start" in the pyrolysis software.
3.5 When the instruments are ready and the pyrolysis software issues a sample injection warning, pressing the top button of the manual injector to make the sample cup fall into the liner of the pyrolysis instrument, starting the running program, the sample begins to be pyrolyzed and enters the chromatographic column for separation, and is detected by mass spectrometry.
3.6 Removing the sample cup after running.
3.7 Opening the qualitative software for qualitative analysis of the test results.

A graph of the gas chromatography-mass spectrometry of Example 2-1 is shown in FIG. 1; wherein, Examples 2-2 to 2-4 can also obtain a graph similar to that of FIG. 1.

A graph of the gas chromatography-mass spectrometry of Comparative Example 2-1 is shown in FIG. 2, and the test conditions of gas chromatography-mass spectrometry are the same as those in Example 2-1;

A graph of the gas chromatography-mass spectrometry of Comparative Example 3-1 is shown in FIG. 3, and the test conditions of gas chromatography-mass spectrometry are the same as those in Example 2-1;

Particularly, in FIG. 1, the characteristic peaks belonging to phenolic resin can be clearly observed, for example, there are characteristic peaks at the retention times of 4.95±0.3 min, 5.32±0.3 min, 5.47±0.3 min, 5.92±0.3 min, 6.10±0.3 min, 6.40±0.3 min and 6.50±0.3 min. According to Table 1, it can be seen that the characteristic groups corresponding to these characteristic peaks belong to the characteristic groups of phenolic resin.

The specific analysis results of the characteristic peaks shown in FIG. 2 are shown in Table 6. It can be seen from FIG. 2 combined with Table 6 that, in Comparative Example 2-1, without high-temperature roasting treatment, in the graph of the gas chromatography-mass spectrometry, the characteristic peaks clearly belonging to coal tar pitch can be obtained, such as the characteristic peaks at retention times of 9.7±0.3 min, 11.6±0.3 min, 12.9±0.3 min and 15.9±0.3 min. According to Table 6, it can be seen that the characteristic groups corresponding to these characteristic peaks belong to the characteristic groups of coal tar pitch.

TABLE 6

Analysis results of the graph of the gas chromatography-mass spectrometry of the green body intermediates prepared in Comparative Example 2-1

| Number | Retention time/min | Qualitative results |
|---|---|---|
| 1 | 1.545 | ammonia, hydrogen sulfide, carbon dioxide, nitrogen |
| 2 | 1.573 | water, sulfur dioxide |
| 3 | 4.241 | indane |
| 4 | 4.459 | methyl phenylacetylene/indene |
| 5 | 4.959 | phenol |
| 6 | 5.322 | o-cresol, methyl indene |
| 7 | 5.592 | m-p-cresol |
| 8 | 5.699 | naphthalene |
| 9 | 6.473 | methylnaphthalene |
| 10 | 6.594 | methylnaphthalene |
| 11 | 7.11 | ethylnaphthalene |
| 12 | 7.198 | dimethylnaphthalene |
| 13 | 7.291 | dimethylnaphthalene, indole |
| 14 | 7.323 | dimethylnaphthalene |
| 15 | 7.463 | dimethylnaphthalene |
| 16 | 7.562 | dimethylnaphthalene |
| 17 | 7.712 | acenaphthylene/biphenylene |
| 18 | 7.793 | acenaphthene/2-vinylnaphthalene |
| 19 | 7.893 | 1-isopropenylnaphthalene |
| 20 | 8.053 | benzofuran |
| 21 | 8.401 | fluorene |
| 22 | 8.589 | 2-methyl biphenyl, 4-biphenylcarboaldehyde |
| 23 | 8.749 | hydroxyfluorene/methyldibenzofuran |
| 24 | 9 | 9,10-dihydroanthracene |
| 25 | 9.069 | 9,10-dihydrophenanthrene |
| 26 | 9.124 | methyl fluorene |
| 27 | 9.187 | methyl fluorene |
| 28 | 9.401 | 1,2,3,4-tetrahydroanthracene |
| 29 | 9.603 | dibenzothiophene |
| 30 | 9.783 | 9-methylene fluorene/phenanthrene/anthracene |
| 31 | 9.839 | 9-methylene fluorene/phenanthrene/anthracene |
| 32 | 9.905 | benzoquinoline |
| 33 | 9.98 | acridine |
| 34 | 10.088 | methyldibenzothiophene |
| 35 | 10.166 | benzoquinoline |
| 36 | 10.23 | methyldibenzo thiophene |
| 37 | 10.371 | methylphenanthrene/methylanthracene |
| 38 | 10.399 | methylphenanthrene/methylanthracene |
| 39 | 10.458 | methylphenanthrene/methylanthracene |
| 40 | 10.506 | benzo [def]fluorene |
| 41 | 10.545 | methyl anthracene |
| 42 | 10.739 | carbazole, 2-phenylnaphthalene |
| 43 | 10.857 | dimethylphenanthrene |
| 44 | 10.998 | dimethylphenanthrene |
| 45 | 11.04 | dimethylphenanthrene |
| 46 | 11.167 | dimethylphenanthrene |
| 47 | 11.606 | fluoranthene/pyrene |
| 48 | 11.848 | benzonaphthofuran, fluoranthene/pyrene |
| 49 | 11.894 | 1-phenylnaphthalene |
| 50 | 12.036 | pyrene |
| 51 | 12.216 | benzonaphthofuran |
| 52 | 12.344 | benzonaphthofuran |
| 53 | 12.503 | methylpyrene/benzofluorene |
| 54 | 12.712 | benzofluorene |
| 55 | 12.903 | benzofluorene |
| 56 | 13.012 | methylpyrene |
| 57 | 13.266 | methylpyrene |
| 58 | 13.357 | methylpyrene |
| 59 | 14.71 | benzonaphthothiophene |
| 60 | 14.755 | triphenylene |
| 61 | 15.027 | cyclopentapyrene |
| 62 | 12.927 | chrysene/triphenylene/benzanthracene |
| 63 | 16.066 | chrysene/triphenylene/benzanthracene |

TABLE 6-continued

Analysis results of the graph of the gas chromatography-mass spectrometry of the green body intermediates prepared in Comparative Example 2-1

| Number | Retention time/min | Qualitative results |
|---|---|---|
| 64 | 16.216 | cyclopentenopyrene/triphenylene |
| 65 | 18.038 | methyl chrysene |
| 66 | 19.761 | benzocarbazole |
| 67 | 20.693 | benzocarbazole |
| 68 | 23.461 | benzofluoranthene/benzopyrene/perylene |

The specific analysis results of the characteristic peaks shown in FIG. 3 are shown in Table 7. It can be seen from FIG. 3 combined with Table 7 that in Comparative Example 3-1, after roasting treatment at 1000° C., in the graph of the gas chromatography-mass spectrometry, it can be seen that the characteristic peaks of long-chain alkanes, such as characteristic peaks at retention times of 1.56±0.3 min, 3.37±0.3 min, 4.88±0.3 min, and 5.60±0.3 min. According to Table 7, it can be seen that the characteristic groups corresponding to these characteristic peaks belong to the characteristic groups of long-chain alkanes; and the characteristic peaks belonging to coal tar pitch also can be seen, such as characteristic peaks at retention times of 9.78±0.3 min, 10.53±0.3 min, 11.6±0.3 min, and 5.60±0.3 min, according to Table 7, it can be seen that the characteristic groups corresponding to these characteristic peaks belong to the characteristic groups of coal tar pitch.

TABLE 7

The analysis results of the graph of gas chromatography-mass spectrometry of cooked blanks prepared in Comparative Example 3-1

| Number | Retention time/min | Qualitative results |
|---|---|---|
| 1 | 1.539 | ammonia,carbon dioxide,nitrogen, hydrogen sulfide |
| 2 | 1.566 | water, sulfur dioxide |
| 3 | 1.691 | carbon disulfide |
| 4 | 3.151 | N-butylenebutylamine |
| 5 | 3.37 | dibutylamine |
| 6 | 4.152 | undecene |
| 7 | 4.883 | dodecane |
| 8 | 5.414 | 4-ethyl-2-propylthiazole |
| 9 | 5.601 | tridecane |
| 10 | 5.69 | naphthalene |
| 11 | 6.287 | tetradecane |
| 12 | 6.471 | methylnaphthalene |
| 13 | 6.788 | N,N-dibutylformamide |
| 14 | 6.939 | pentadecane |
| 15 | 7.554 | hexadecane |
| 16 | 7.992 | 2,4-di-tert-butylphenol, undecylcyclopentane |
| 17 | 8.545 | 3-methylheptadecane |
| 18 | 8.621 | undecylcyclohexane |
| 19 | 8.701 | octadecane |
| 20 | 8.73 | 5,5-diethylpentadecane |
| 21 | 9.057 | 3,3 -diethylpentadecane |
| 22 | 9.557 | 3-ethyl-3-methylheptadecane |
| 23 | 9.78 | 9-methylene fluorene/anthracene/phenanthrene |
| 24 | 9.84 | 9-methylene fluorene/anthracene/phenanthrene |
| 25 | 9.999 | (3-hexyl)isobutyl phthalate |
| 26 | 10.537 | dibutyl phthalate |
| 27 | 11.602 | fluoranthene/pyrene |
| 28 | 12.03 | fluoranthene/pyrene |
| 29 | 15.91 | chrysene/triphenylene/benzanthracene |

TABLE 7-continued

The analysis results of the graph of gas chromatography-mass spectrometry of cooked blanks prepared in Comparative Example 3-1

| Number | Retention time/min | Qualitative results |
|---|---|---|
| 30 | 16.052 | chrysene/triphenylene/benzanthracene |
| 31 | 23.363 | benzofluoranthene/benzopyrene/perylene |
| 32 | 25.957 | benzofluoranthene/benzopyrene/perylene |
| 33 | 26.48 | benzofluoranthene/benzopyrene/perylene |
| 34 | | |

TABLE 8

Indexes of green bodies of Examples 1-1 to 1-8 and Comparative Example 1-1

| | Volume density g/m$^3$ | Appearance intact rate (no cracks and no gaps) |
|---|---|---|
| Example 1-1 | 1.77 | 98% |
| Example 1-2 | 1.76 | 90% |
| Example 1-3 | 1.78 | 99% |
| Example 1-4 | 1.76 | 95% |
| Example 1-5 | 1.74 | 92% |
| Example 1-6 | 1.75 | 87% |
| Example 1-7 | 1.74 | 91% |
| Example 1-8 | 1.73 | 88% |
| Comparative Example 1-1 | 1.74 | 82% |

In Table 8, the appearance intact rate of the resin carbon anode green body with no cracks, no gaps and rounded shape is defined as 100%.

Experimental Example 2 Indexes of the Green Body Intermediate

The compressive strength of the intermediate is detected according to the detection method in YS/T 285-2012.

TABLE 9

Indexes of the resin carbon anode green body intermediates

| | Compressive strength (MPa) | Volatile component |
|---|---|---|
| Example 2-1 | 45 | 1.05% |
| Example 2-2 | 40 | 1.02% |
| Example 2-3 | 38 | 0.98% |
| Example 2-4 | 41 | 0.97% |
| Example 2-5 | 37 | 0.98% |
| Example 2-6 | 41 | 1.3% |
| Example 2-7 | 37 | 0.4% |
| Example 2-8 | 46 | 1.3% |
| Example 2-9 | 38 | 0.3% |
| Comparative Example 2-1 | 36 | 0.1% |

In Table 9, the appearance intact rate of the resin carbon anode green body with no cracks, no gaps and rounded shape is defined as 100%.

The content of the volatile component is a measure of the degree of hardening. In principle, the content of the volatile component is a specific value, and it is most energy efficient to stop immediately once this specific value is reached. If the time is too short, there will be less volatile component, and the impurities will not be fully volatilized at this temperature, and subsequent high-temperature calcination may cause anode cracks. If the time is too long, the content of the volatile component will reach a specific value, but the energy consumption will increase.

Example 3 Carbon Anode Indexes

The volume density is detected according to the detection method in YS/T 285-2012.

TABLE 10

Carbon anode indexes

| | Compressive strength (MPa) | Volume density g/m³ | Resistivity uΩ · m | Ignition loss/% |
|---|---|---|---|---|
| Example 3-1 | 45 | 1.70 | 54 | 3.2 |
| Example 3-2 | 42 | 1.63 | 52 | 3.2 |
| Example 3-3 | 40 | 1.65 | 51 | 3.3 |
| Example 3-4 | 44 | 1.64 | 55 | 2.8 |
| Example 3-5 | 40 | 1.63 | 54 | 3.3 |
| Example 3-6 | 43 | 1.70 | 58 | 2.9 |
| Example 3-7 | 39 | 1.69 | 60 | 3.8 |
| Example 3-8 | 46 | 1.72 | 50 | 3.0 |
| Example 3-9 | 42 | 1.67 | 57 | 4.0 |
| Example 3-10 | 46 | 1.71 | 60 | 2.7 |
| Comparative Example 3-1 | 34 | 1.57 | 57 | 6.8 |
| Comparative Example 3-2 | 35 | 1.72 | 63 | 1.8 |

Although the present application has been disclosed with examples as above, it is not intended to limit the present application. Anyone with ordinary knowledge in the art can make some changes and modifications without departing from the spirit and scope of the present application. Therefore, the protection scope of the present application shall be defined by the appended claims of the present application.

The invention claimed is:

1. A resin carbon anode green body, characterized in that, a resin carbon anode green body intermediate is obtained by hardening treatment of the resin carbon anode green body, and when tested by gas chromatography-mass spectrometry, the resin carbon anode green body intermediate exhibits peaks at retention times of 4.95±0.3 min, 5.32±0.3 min, 5.47±0.3 min and 5.92±0.3 min.

2. The resin carbon anode green body according to claim 1, characterized in that, when tested by gas chromatography-mass spectrometry, the resin carbon anode green body intermediate exhibits peaks at retention times of 4.95±0.3 min, 5.32±0.3 min, 5.47±0.3 min, 5.92±0.3 min, 6.10±0.3 min, 6.40±0.3 min and 6.50±0.3 min.

3. The resin carbon anode green body according to claim 1, characterized in that, when tested by gas chromatography-mass spectrometry, the resin carbon anode green body intermediate exhibits peaks at retention times of 2.50±0.3 min, 4.16±0.3 min, 4.86±0.3 min, 4.95±0.3 min, 5.32±0.3 min, 5.47±0.3 min, 5.64±0.3 min, 5.92±0.3 min, 6.10±0.3 min, 6.40±0.3 min, 6.50±0.3 min, 7.31±0.3 min, 8.85±0.3 min, 9.84±0.3 min, 10.46±0.3 min, 11.60±0.3 min, 15.03±0.3 min and 16.04±0.3 min.

4. The resin carbon anode green body according to claim 1, characterized in that, the resin carbon anode green body is obtained by kneading and forming treatment of a mixed material comprising modified phenolic resin and aggregate; optionally, before the kneading treatment, a temperature of the modified phenolic resin is raised to 30-50° C.

5. The resin carbon anode green body according to claim 4, characterized in that, the modified phenolic resin comprises lignin-modified phenolic resin, a polyphenolic compound-modified phenolic resin, a polyhydroxy compound-modified phenolic resin.

6. The resin carbon anode green body according to claim 4, characterized in that, the aggregate comprises one or more selected from the group consisting of of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm.

7. The resin carbon anode green body according to claim 4, characterized in that,
during the kneading treatment, a kneading time is 10-100 min, and a kneading temperature is 40-60° C.;
optionally, during the kneading treatment, the modified phenolic resin is continuously added within 10-30 min until the addition is completed.

8. The resin carbon anode green body according to claim 4, characterized in that, in a raw material of the resin carbon anode green body, in parts by weight, the modified phenolic resin is 5-15 parts, and the aggregate is 85-95 parts.

9. The resin carbon anode green body according to claim 4, characterized in that, the forming treatment is carried out using an electric screw press or a vibration press.

10. The resin carbon anode green body according to claim 4, characterized in that, the resin carbon anode green body is obtained by the kneading and forming treatment of the mixed material comprising modified phenolic resin and aggregate, and then subjected to a test of the gas chromatography-mass spectrometry after hardening treatment; wherein, a hardening temperature is 120-270° C., and a pyrolysis temperature selected for the test is 600° C.

11. A resin carbon anode green body intermediate, characterized in that, the green body intermediate is obtained by hardening treatment of the green body of claim 1, wherein a content of a volatile component of the green body intermediate is 0.4-2%;
optionally, a volume density of the green body intermediate is 1.6-1.8 g/m³; and
optionally, a hardening temperature is 120-270° C., and a hardening time is 1-10 h.

12. A method for preparing the resin carbon anode green body intermediate of claim 11, characterized in that, the method comprising:
mixing materials: a mixed material comprises modified phenolic resin and aggregate;
kneading treatment: a kneading time is 10-100 min;
forming treatment: being carried out using an electric screw press or a vibration press;
hardening treatment: a hardening temperature is 120-270° C., and a hardening time is 1-10 h;
optionally, before the kneading treatment, a temperature of the modified phenolic resin is raised to 30-50° C.; and
optionally, during the kneading treatment, the modified phenolic resin is continuously added within 10-30 min until the addition is completed, and a kneading temperature is 40-60° C.

13. A carbon anode, obtaining by kneading, forming, hardening, and roasting treatment of a mixed material comprising modified phenolic resin and aggregate; or by roasting treatment of the resin carbon anode green body intermediate of claim 11.

14. The carbon anode according to claim 13, characterized in that,
the modified phenolic resin comprises lignin-modified phenolic resin, a polyphenolic compound-modified phenolic resin, a polyhydroxy compound-modified phenolic resin, or a mixture thereof.

15. The carbon anode according to claim 13, characterized in that,
the aggregate comprises one or more selected from the group consisting of calcined coke with a particle size of 8-5 mm, calcined coke with a particle size of 5-3 mm, calcined coke with a particle size of 3-1 mm, calcined coke with a particle size of 1-0 mm, and a calcined coke fine powder with a particle size of less than 0.075 mm.

16. The carbon anode according to claim 13, characterized in that, in a raw material of the carbon anode, in parts by weight, the modified phenolic resin is 5-15 parts, and the aggregate is 85-95 parts.

17. The carbon anode according to claim 13, characterized in that,
during the kneading treatment, a kneading time is 10-100 min, and a kneading temperature is 40-60° C.;
optionally, during the kneading treatment, the modified phenolic resin is continuously added within 10-30 min until the addition is completed.

18. The carbon anode according to claim 14, characterized in that, the forming treatment is carried out using an electric screw press or a vibration press.

19. The carbon anode according to claim 14, characterized in that, during the hardening treatment: a hardening temperature is 120-270° C., and a hardening time is 1-10 h.

20. The carbon anode according to claim 19, characterized in that, during the roasting treatment, in the stage of room temperature to 270° C., a rate of raising temperature is 3-60° C./h; in the stage of 270-500° C., a rate of raising temperature is 3-60° C./h; in the stage of 500-800° C., a rate of raising temperature is 10-50° C./h, in the stage of 800-1100° C., a rate of raising temperature is 10-30° C./h.

21. The resin carbon anode green body according to claim 5, wherein
the lignin is acidic lignin,
the polyphenolic compound is one or more selected from the group consisting of pyrogallol, tea polyphenols, tannic acid and tannin extract, and
the polyhydroxy compound is one or more selected from the group consisting of maltose, sucrose, glucose, fructose, oxidized starch, sorbitol, and dextrin.

22. The resin carbon anode green body according to claim 6, wherein in terms of a mass percentage of a total weight of the aggregate,
the calcined coke with the particle size of 8-5 mm is 5-20 wt %,
the calcined coke with the particle size of 5-3 mm is 10-25 wt %,
the calcined coke with the particle size of 3-1 mm is 15-30 wt %,
the calcined coke with the particle size of 1-0 mm is 10-20 wt %, and
the calcined coke fine powder with the particle size of less than 0.075 mm is 25-45 wt %.

23. The resin carbon anode green body according to claim 7, wherein during the kneading treatment, the modified phenolic resin is continuously added within 10-30 min until the addition is completed, and a flow rate of the modified phenolic resin during continuous addition is 1-3 kg/s.

24. The method of claim 12, wherein during the kneading treatment, the modified phenolic resin is continuously added within 10-30 min until the addition is completed, the kneading temperature is 40-60° C., and a flow rate of the modified phenolic resin during continuous addition is 1-3 kg/s.

25. The carbon anode according to claim 14, wherein
the lignin is acidic lignin,
the polyphenolic compound is one or more selected from the group consisting of pyrogallol, tea polyphenols, tannic acid and tannin extract, and
the polyhydroxy compound is one or more selected from the group consisting of maltose, sucrose, glucose, fructose, oxidized starch, sorbitol, and dextrin.

26. The carbon anode according to claim 15, wherein in terms of a mass percentage of a total weight of the aggregate,
the calcined coke with the particle size of 8-5 mm is 5-20 wt %,
the calcined coke with the particle size of 5-3 mm is 10-25 wt %,
the calcined coke with the particle size of 3-1 mm is 15-30 wt %,
the calcined coke with the particle size of 1-0 mm is 10-20 wt %, and
the calcined coke fine powder with the particle size of less than 0.075 mm is 25-45 wt %.

27. The carbon anode according to claim 17, wherein during the kneading treatment, the modified phenolic resin is continuously added within 10-30 min until the addition is completed, and a flow rate of the modified phenolic resin during continuous addition is 1-3 kg/s.

28. The carbon anode according to claim 19, wherein the roasting treatment is microwave roasting treatment, oven roasting treatment, tunnel kiln roasting treatment, inverted flame kiln roasting treatment, multi-chamber ring roasting furnace roasting treatment, Muffle furnace roasting treatment or roasting furnace roasting treatment.

29. The carbon anode according to claim 19, wherein compared with the carbon anode green body intermediate, the carbon anode has an ignition loss of 2-6%.

30. The carbon anode according to claim 19, wherein the roasting treatment is carried out under the carbon embedded condition or under a protection of inert gas.

* * * * *